United States Patent [19]
Szirtes

[11] Patent Number: 5,265,853
[45] Date of Patent: Nov. 30, 1993

[54] EXTENDED ANGULAR RANGE FLEXURAL PIVOT

[76] Inventor: Thomas Szirtes, 790 Cummer Avenue, Willowdale, Ontario, M2H 1E7, Canada

[21] Appl. No.: 850,319

[22] Filed: Mar. 12, 1992

[51] Int. Cl.[5] .............................. F16F 1/18
[52] U.S. Cl. ................................ 267/160; 267/154; 16/227; 403/291
[58] Field of Search .............. 267/150, 160, 182, 154; 16/365, 227; 403/220, 291, 121; 244/173, 131, 137.4

[56] References Cited

U.S. PATENT DOCUMENTS

| | | |
|---|---|---|
| 3,239,207 | 3/1966 | Camossi ........................... 267/154 |
| 3,807,029 | 4/1974 | Troeger. |
| 3,811,665 | 5/1974 | Seelig. |
| 3,813,089 | 5/1974 | Troeger. |
| 3,825,992 | 7/1974 | Troeger. |
| 3,913,656 | 10/1975 | Guyer ................................. 16/227 |
| 4,438,605 | 3/1984 | DeLucia ............................ 16/227 |
| 4,561,614 | 12/1985 | Olikara et al. ..................... 244/173 |

*Primary Examiner*—Robert J. Oberleitner
*Assistant Examiner*—Lee W. Young

[57] ABSTRACT

A spring hinge between panels of a satellite panel array comprises a plurality of serially joined known flexural pivots of the type having two cylindrical members with tongues from each extending into the other joined by a flat spring. One panel has an abutment for limiting the rotation of the next panel with respect thereto such that the spring hinge remains partially stressed when the panels are deployed. In another embodiment, two pluralities of serially joined pivots act in parallel.

15 Claims, 5 Drawing Sheets

EXTENDED ANGULAR RANGE FLEXURAL PIVOT

BACKGROUND OF THE INVENTION

1. Field of the Invention

This invention relates to a pivot assembly.

2. Description of the Related Art

Satellite arrays comprise a number of panels hinged one to another. The hinges comprise a shaft, bearing and spring motor. During transport, the array is folded against the bias of the spring motors so that panels overlie each other and the array is then latched in this position. For deployment, the latch is released. The spring hinge between the panels operates only once, however, it is critical that this one time operation is successful. Comprising three parts, the hinge described presents the possibility of failure.

The subject invention seeks to overcome drawbacks in the prior art.

SUMMARY OF THE INVENTION

According to the present invention, there is provided a pivot assembly comprising a plurality of pivots to, each pivot comprising a first member, a second member separate from said first member, and a resilient interconnection interconnecting said first member and said second member for permitting flexing of said first member with respect to said second member along a flexing axis passing through said first member and said second member, said plurality of pivots serially joined with said first member of a given pivot, other than a pivot at one end of said plurality of pivots, joined to said second member of a next adjacent pivot such that their flexing axes are substantially coincident, said first member of said pivot at said one end for joining to a first part, said second member of a pivot at an opposite end of said plurality of pivots for joining to a second part, said first member and said second member of each pivot of said plurality of pivots, other than said first member of said pivot at said one end and said second member of said pivot at said opposite end, for being free from interconnections to said first part and said second part whereby the flexural freedom of said first member of said pivot at said one end with respect to said second member of said pivot at said opposite end is greater than the flexural freedom of a first member with respect to a second member of any given one of said plurality of pivots.

BRIEF DESCRIPTION OF THE DRAWINGS

In the figures which disclose example embodiments of the invention.

DESCRIPTION OF THE PREFERRED EMBODIMENTS

Figure 1:
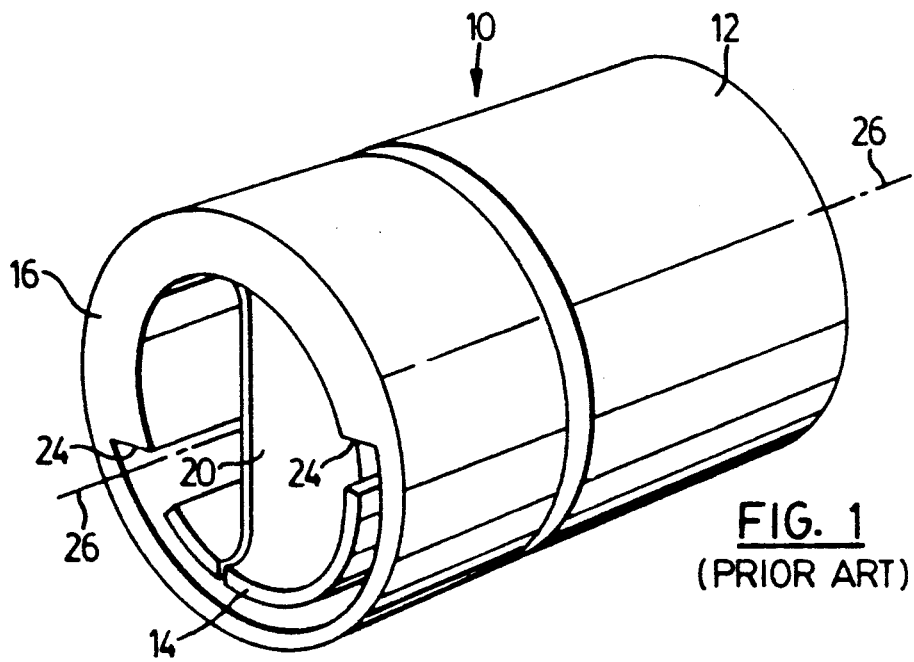
FIG. 1 is a perspective view of a prior art cantilevered pivot.
Figure 2:
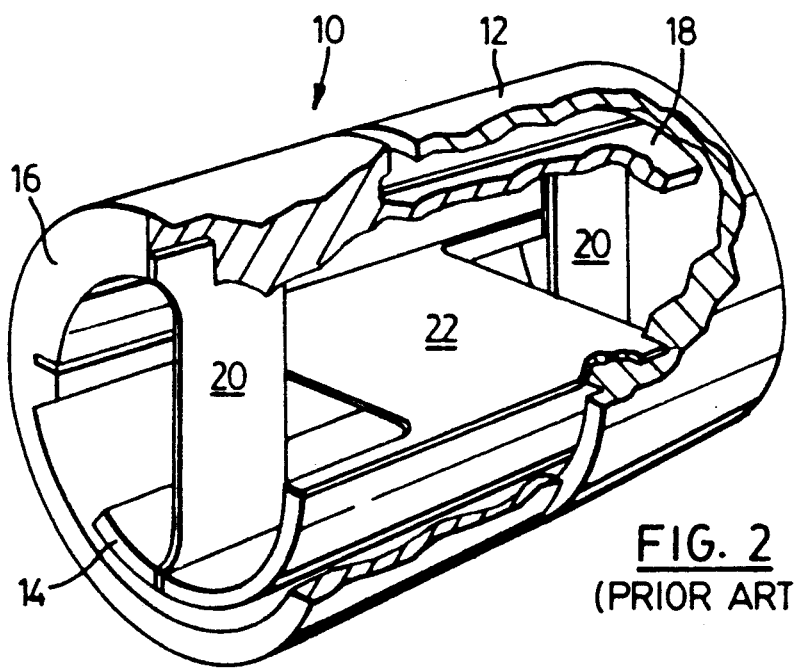
FIG. 2 is a partially cut-away perspective view of the pivot of FIG. 1.

U.S. Pat. Nos. 3,807,029 issued Apr. 30, 1974 to Troeger; 3,811,655 issued May 21, 1974 to Seelig; 3,813,089 issued May 28, 1974 to Troeger; and 3,825,922 issued Jul. 30, 1974 to Troeger all describe a flexural pivot illustrated in FIGS. 1 and 2. Turning first to FIGS. 1 and 2, the pivot 10 comprises a first cylindrical member 12 having a tongue 14 which projects into a second cylindrical member 16. The second cylindrical member 16 also has a tongue 18 which projects into the first cylindrical member 12.

A D-shaped spring 20 of flat spring steel extends diametrically across the interior of the cylindrical members being anchored at one side to cylinder 16 and at its other side to cylinder 12. An I-shaped spring 22 also extends diametrically across the inside of the cylinders at right angles to the D-shaped spring and is anchored at one side to cylinder 16 and at its other side to cylinder 12. The cylindrical members are thus held together by the springs (which act as resilient interconnections) with a common longitudinal axis 26 and with each tongue 14, 18 held within the other cylinder so as to clear the inner wall of such other cylinder. Each cylinder has abutments 24 placed in the path of tongues 14 and 18 in order to limit the rotation of one of the cylinders with respect to the other.

With this arrangement the cylinders 12 and 16 are urged toward an unstressed position illustrated in FIGS. 1 and 2. One cylinder may be pivoted with respect to the other about the common longitudinal axis 26 from this unstressed position until the tongues come into contact with the abutments. The common longitudinal axis 26 is therefore a flexural axis. The abutments are necessary since without same the pivot could be rotated beyond the resilient limits of the two springs. Furthermore, excessive angular rotation will cause centre shifting. The resilient limit depends upon the thickness of the springs. In practice, the pivot may be constructed to provide a maximum of about 30° rotation on either side of the rest position.

This known flexural pivot provides the following advantages: frictionless operation; no need of lubrication; characteristics that are invariant of pressure; and unlimited dormant lifetime. The principal drawback of the pivot is its limited angular range.

Figure 3:
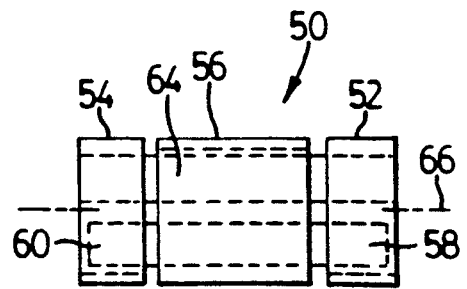
FIG. 3 is a side-view of prior art double-ended pivot.

FIG. 3 illustrates a known variation of the pivot of FIGS. 1 and 2. Turning to FIG. 3, the pivot 50 comprises a first cylindrical base member 56 and two end members 52 and 54. A tongue 58 extends from base member 56 into cylindrical end member 52 and a second tongue 60 extends from base 56 into cylindrical end member 54. A tongue 64 extends through base member 56 and is joined to end members 52 and 54. Springs (not shown) extend diametrically across the interior of the base and end members and join each end member to the base. In use, end members 52 and 54 are connected to one part and base member 56 to another such that the two parts may be rotated with respect to each other up to a maximum of about 30° about flexural axis 66 on either side of an unstressed position.

Figure 4:
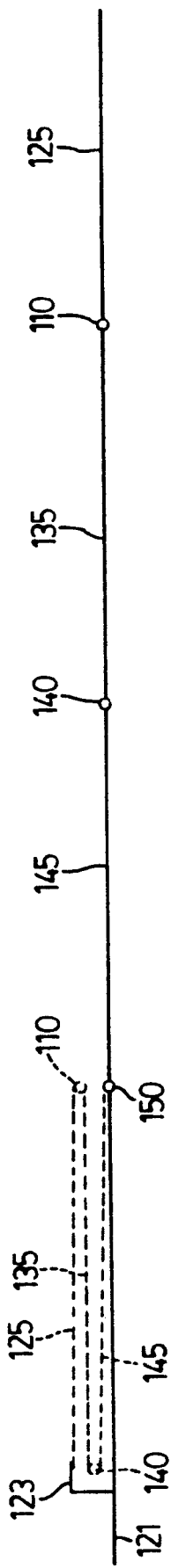
FIG. 4 is a schematic side view of a satellite panel array made in accordance with this invention.

Turning to FIGS. 4, a panel array of a satellite comprises panels 125, 135, and 145. The panels are joined by pivot assemblies 110 and 140. A pivot assembly 150 joins panel 145 to the base 121.

Figure 5:
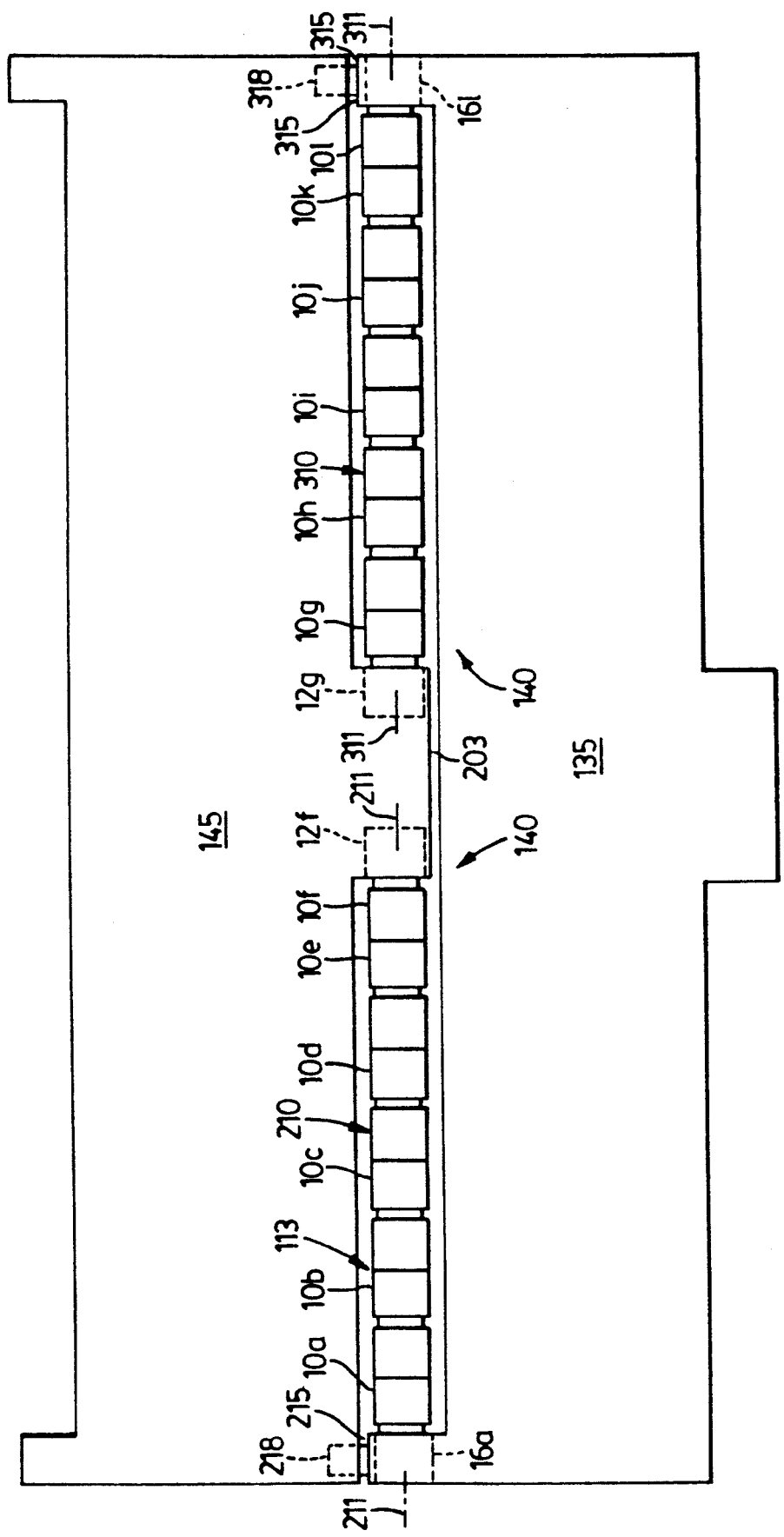
FIG. 5 is a plan view of a portion of the panel array of FIG. 4.

With reference to FIG. 5, which is a top view of a portion of FIG. 4, pivot assembly 140 comprises subassembly 210 which is a series of pivots 10a, 10b, 10c, 10d, 10e, and 10f joined one to another in end-to-end relation so as to have a common longitudinal axis 211 (and therefore a common flexing axis) and a mirror image sub-assembly 310 which is a series of pivots 10g, 10h, 10i, 10j, 10k, and 10l joined end-to-end. The flexing axis 311 of pivot assembly 310 is coincident with flexing axis 211. The pivots 10a through 10f and 10g through 10l are joined by welds 113 and are each constructed in accordance with the cantilevered pivot 10 shown in FIGS. 1 and 2.

Sleeve 215 of panel 135 is welded over the second cylindrical member 16a of pivot 10a and sleeve 315 of panel 135 is welded over the second cylindrical member 161 of pivot 101. Sleeve 203 of panel 145 is welded over both the first cylindrical member 12f of pivot 10f and the first cylindrical member 12g of pivot 10g. Sub-assembly 210 and sub-assembly 310 have such an orientation in pivot assembly 110 that each pivot 10a through 10l is close to its unstressed position (illustrated in FIG. 1) when the panels 135 and 145 are in their deployed position illustrated in FIG. 5. However, abutments 218, 318 extend from sleeves 215, 315, respectively of panel 135 and abut panel 145 when panels 135 and 145 are in their deployed position. The orientation of abutments 218, 318 is such that the pivots of pivot assembly 110 do not quite reach their unstressed position when the panel 145 contacts the abutments. In this way, the abutments ensure the pivot assembly 110 has a residual torque maintaining the panel 145 in its deployed position. Pivot assemblies 140 and 150 are of similar construction to pivot assembly 110.

It will be apparent that while a single pivot 10a, 10b, 10c, 10d, 10e, 10f of sub-assembly 210 would permit only at most about 30° of rotation from its rest position, the six end-to-end pivots 10a through 10f, being connected in series, permit 180° of rotation. Similarly, the six pivots 10g through 10l of pivot assembly 310 which are connected in series also permit 180° of rotation. The two sub-assemblies 210 and 310 are connected in parallel so that the composite assembly 110 also permits 180° of rotation. Assemblies 140 and 150, being similarly constructed, also permit 180° of rotation.

In the operation of the device of FIGS. 4 and 5, panel 125 may be rotated about the flexing axis of pivot assembly 110 through 180° from its deployed position illustrated in solid lines in FIG. 4. Panels 135 and 145 may be similarly rotated such that the panels attain the position illustrated in phantom in FIG. 4. Latch 123 of base 121 may then be interposed over panel 125 in the return path of the panels in order to latch the panels in this position. Each pivot assembly 110, 140, 150 shown in FIG. 4 acts as a spring hinge. Thus, when latch 123 is released, the panels will return to their deployed position illustrated in solid lines in FIG. 4 with abutments holding each panel in a position such that the pivot assemblies are partially stressed so as to have a residual torque which maintains each panel in their deployed position.

Figure 6:
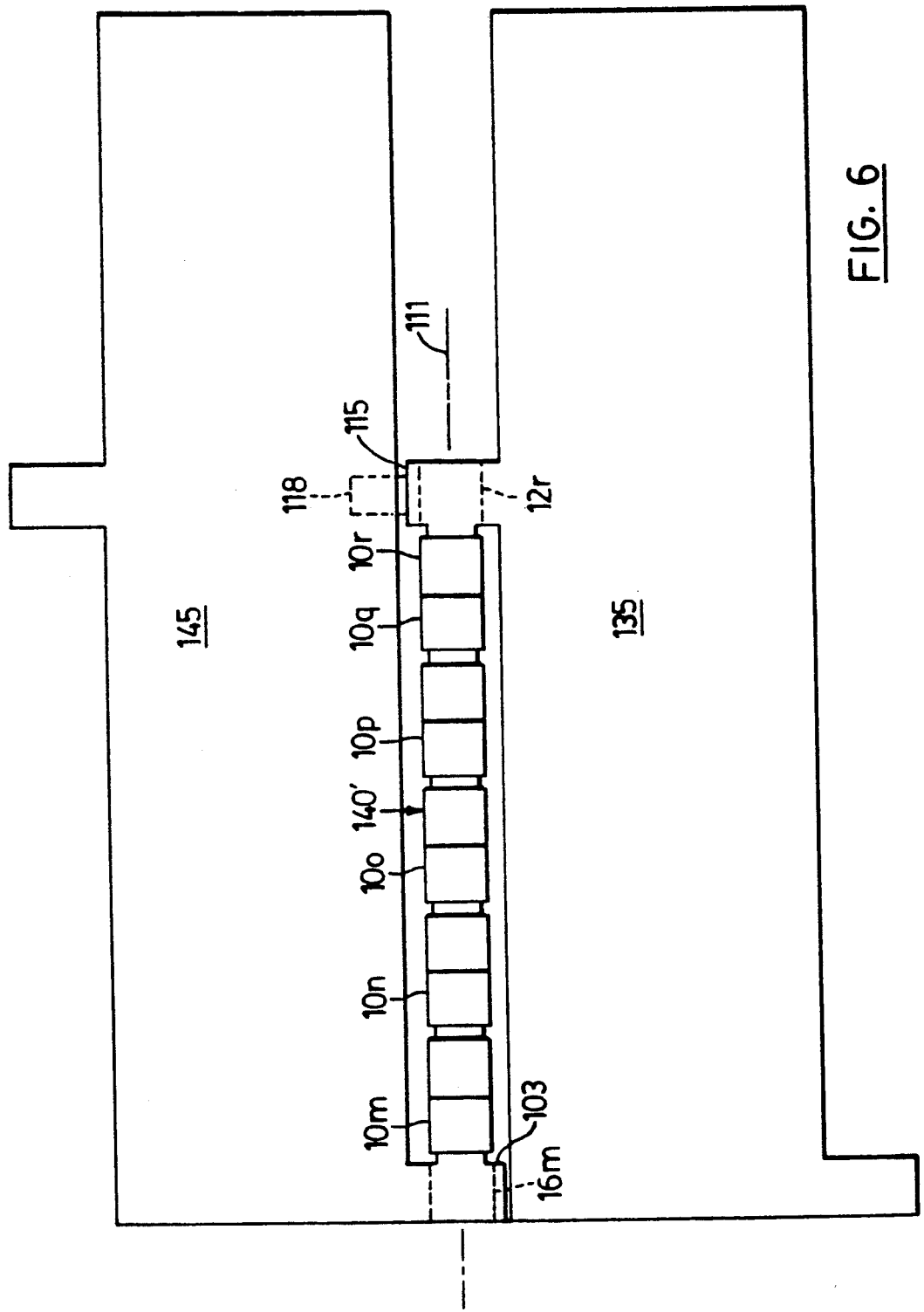
FIG. 6 is an alternate plan view of a portion of the panel array of FIG. 4.

FIG. 6 is an alternate top view of a portion of FIG. 4. Turning to FIG. 6, pivot assembly 140' comprises pivots 10m, 10n, 10o, 10p, 10q, and 10r (each constructed in accordance with the cantilevered pivot 10 shown in FIGS. 1 and 2) welded one to another in end-to-end relation so as to have a common flexing axis 111. Sleeve 115 of panel 135 is welded over the first cylindrical member 12r of pivot 10r. Sleeve 103 of panel 145 is welded over the second cylindrical member 16m of pivot 10m. The pivots of pivot assembly 140' have such an orientation that each pivot 10m through 10r is close to its unstressed position (illustrated in FIG. 1) when the panels 135 and 145 are in their deployed position illustrated in FIG. 6. However, an abutment 118 extends from sleeve 115 of panel 135 and abuts panel 145 when panels 135 and 145 are in their deployed position. The orientation of abutment 118 is such that the pivots of pivot assembly 140' do not quite reach their unstressed position when the panel 145 contacts the abutment. In this way, the abutments ensure the pivot assembly 140' has a residual torque maintaining the panel 145 in its deployed position. Pivot assemblies between panels 125 and 135 and the pivot assembly between panel 145 and base 121 are of similar construction.

It will be apparent that while a single pivot of pivot assembly 140' would permit only at most about 30° of rotation from its rest position, the six end-to-end pivots 10m through 10r permit 180° of rotation and the pivot assembly acts as a spring hinge. Thus, the operation of the device of FIGS. 4 and 6 is identical to that described in connection with FIGS. 4 and 5.

Figure 7:
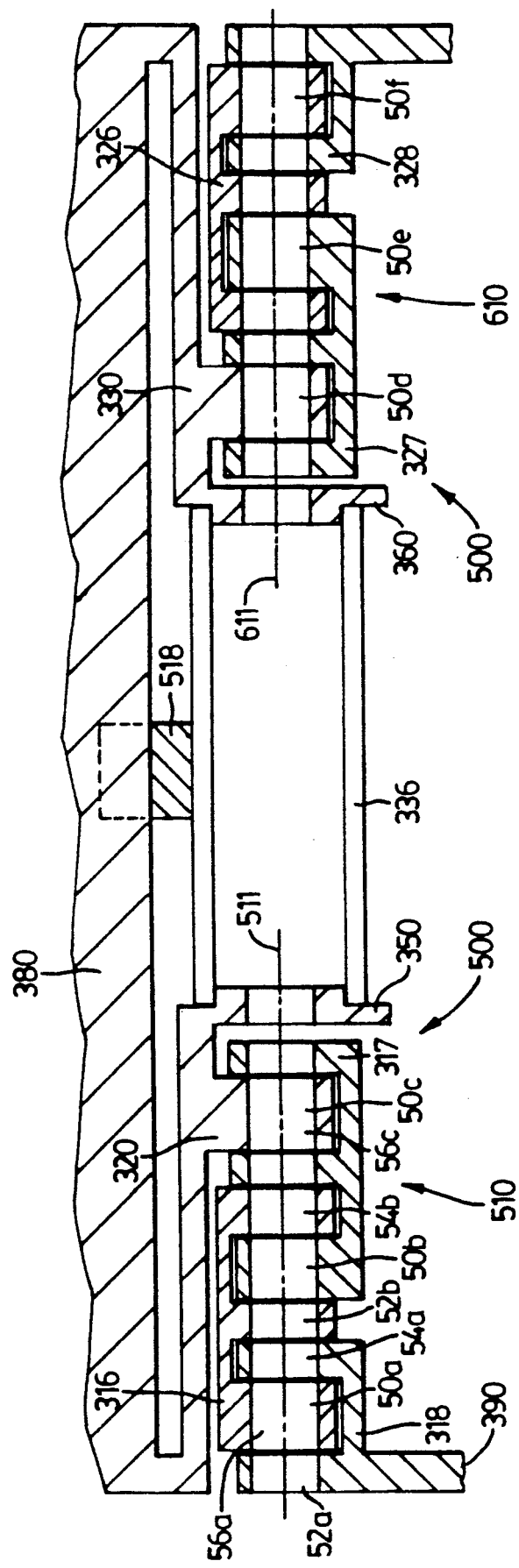
FIG. 7 is a cross-sectional view of a portion of a panel array made in accordance with a further aspect of this invention.

FIG. 7 represents a cross-sectional top view of a portion of a panel array made in accordance with further embodiment of this invention. Turning to FIG. 7, a pivot assembly 500 comprises sub-assembly 510 which is a series of double-ended pivots 50a, 50b, 50c joined one to another in end-to-end relation so as to have a common longitudinal axis 511 (and therefore a common flexing axis) and a mirror image sub-assembly 610 which is a series of double-ended pivots 50d, 50e, 50f joined one to another in end-to-end relation. The flexing axis 611 of pivot sub-assembly 610 is coincident with flexing axis 511. Each of the double-ended pivots is of the type illustrated in FIG. 3.

The manner of joining the series of pivots of subassembly 510 is as follows. Base 56a of pivot 50a is connected to the ends 52b, 54b of pivot 50b by E-shaped sleeve 316. The E-shaped sleeve comprises three coaxial cylindrical portions joined by a spine. Similarly, pivot 50b is connected to pivot 50c by E-shaped sleeve 317. The base 56c of pivot 50c is connected to the solar panel 380 by sleeve 320. The ends 52a, 54a of pivot 50a are connected to base 390 of a satellite by h-shaped sleeve 318 which comprises two coaxial cylindrical portions joined by a spine.

With sub-assembly 610, pivot 50d is connected to the panel 380 by sleeve 330 and pivot 50f to the base 390 by h-shaped sleeve 328. Further, the base of pivot 50e is connected to the ends of pivot 50d by E-shaped sleeve 327 and the base of pivot 50f is connected to the ends of pivot 50e by E-shaped sleeve 326.

Each of the sleeves is welded to the portion of the pivot it surrounds.

The panel 380 terminates in depending flange 350 which is coaxial with the flexing axes 511, 611 and is positioned adjacent pivot 50c. A similar flange 360 is coaxial with the flexing axes and adjacent pivot 50d. A cylindrical sleeve 336 connects flange 350 and flange 360. Since the panel is connected to pivot 50c and 50d through sleeves 320 and 330, the cylindrical sleeve 336 and sleeves 320 and 330 join the inner end of pivot sub-assembly 510 to the inner end of pivot sub-assembly 610.

An abutment 518 extending from sleeve 336 limits the degree to which panel 380 may open. The pivot sub-assemblies 510 and 610 are oriented such that when each pivot of one is close to its unstressed position (i.e., the position in which the flat springs joining the ends of the pivot with its base are not flexed), each pivot of the other is also close to its unstressed position. Furthermore, the panel 380 is joined to each pivot sub-assembly such that when the pivots of these subassemblies are close to their unstressed positions, the panel abuts abutment 518 and is in a deployed position. Abutment 518 prevents the pivots of each assembly from moving completely to their unstressed positions so as to provide a residual torque maintaining panel 380 in its deployed position.

With the arrangement of FIG. 7, given that each pivot 50a through 50f permit about 30° of rotation, the three series pivots of sub-assembly 510 permit about 90° of rotation. Similarly, the three series pivots of sub-assembly 610 provide about 90° of rotation. The sub-assembly 510 is mounted in parallel with sub-assembly 610 so that the composite pivot assembly 500 also allows about 90° of rotation. Accordingly, the panel 380 may be rotated from its deployed position to a closed position which is rotated 90° from the deployed position. In the closed position, the pivot assemblies apply a biasing torque; the panel may be latched in this closed position. For deployment, the panel may be unlatched such that the pivots will rotating the panel about 90° from its closed position into abutment with abutment 518.

The cantilevered pivots of FIGS. 5 and 6 could be joined end-to-end by manufacturing the one cylindrical member of adjacent pivots from one integral cylindrical portion. The pivot assemblies of this invention will have application to other than spring hinges for satellite panels, as will be apparent to those skilled in the art. Other modifications will be apparent to those skilled in the art and, therefore, the invention is defined in claims.

What is claimed is:

1. A pivot assembly comprising a plurality of pivots, each pivot comprising a first member, a second member separate from said first member, and a resilient interconnection interconnecting said first member and said second member for permitting flexing of said first member with respect to said second member along a flexing axis passing through said first member and said second member, said plurality of pivots serially joined with said first member of a given pivot, other than a pivot at one end of said plurality of pivots, joined to said second member of a next adjacent pivot such that their flexing axes are substantially coincident, said first member of said pivot at said one end for joining to a first part, said second member of a pivot at an opposite end of said plurality of pivots for joining to a second part, said first member and said second member of each pivot of said plurality of pivots, other than said first member of said pivot at said one end and said second member of said pivot at said opposite end, for being free from interconnections to said first part and said second part whereby the flexural freedom of said first member of said pivot at said one end with respect to said second member of said pivot at said opposite end is greater than the flexural freedom of a first member with respect to a second member of any given one of said plurality of pivots.

2. The pivot assembly of claim 1 wherein, for each pivot, said first member has a tongue disposed about said flexing axis protruding into said second member and said second member has a tongue disposed about said flexing axis protruding into said first member.

3. The pivot assembly of claim 2 wherein said resilient interconnection of each pivot comprises two separate flat springs positioned at right angles to each other and crossing said flexing axis.

4. The pivot assembly of claim 3 wherein each pivot further comprises abutment means on at least one of said first member and said second member for limiting flexing of said pivot in either sense about said flexing axis.

5. A spring hinge comprising a first plurality of pivots and a second plurality of pivots, each pivot comprising a first member, a second member separate from said first member, and a resilient interconnection interconnecting said first member and said second member for permitting flexing of said first member with respect to said second member along a flexing axis passing through said first member and said second member, said first plurality of pivots serially joined with the first member of a given pivot, other than a pivot extending from a first end of said first plurality of pivots, joined to the second member of a next adjacent pivot such that their flexing axes are substantially coincident and said second plurality of pivots serially joined with the first member of a given pivot, other than a pivot extending from a first end of said second plurality of pivots, joined to a first end of said second plurality of pivots, joined to the second member of a next adjacent pivot such that their flexing axes are substantially coincident, said first and second plurality of pivots having a substantially common axis comprising said substantially common flexing axes of said first plurality of pivots and said substantially common flexing axes of said second plurality of pivots such that said first end of said first plurality of pivots and said first end of said second plurality of pivots are opposed, a first part joined to said first member of said pivot extending from said first end of said first plurality of pivots and to said first member of said pivot extending from said first end of said second plurality of pivots, and a second part joined to said second member of a pivot of said first plurality of pivots extending from a second end of said first plurality of pivots and to said second member of a pivot of said second plurality of pivots extending from a second end of said second plurality of pivots, said first member and said second member of each of said first plurality of pivots and said second plurality of pivots, other than said first member of said pivot at said first end of said first plurality of pivots, said first member of said pivot at said first end of said second plurality of pivots, said second member of said pivot at said second end of said first plurality of pivots, and said second member of said pivot at said second end of said second plurality of pivots, being free from interconnections to said first part and said second part.

6. The spring hinge of claim 5 including abutment means extending from said first part for abutting said second part to limit the rotation of said second part with respect to said first part to a position whereat the pivots of said first and second plurality of pivots remain partially stressed.

7. The spring hinge of claim 6 including latch means for latching said first and second parts in a position whereat said second part is not in abutment with said abutment means.

8. The spring hinge of claim 7 wherein, for each pivot, said first member has a tongue disposed about said flexing axis protruding into said second member and said second member has a tongue disposed about said flexing axis protruding into said first member.

9. The spring hinge of claim 8 wherein said resilient interconnection of each pivot comprises two separate flat springs positioned at right angles to each other and crossing said flexing axis.

10. The spring hinge of claim 9 wherein each pivot further comprises abutment means on at least one of said first member and said second member for limiting flexing of said pivot in either sense about said flexing axis.

11. A spring hinge comprising a first plurality of pivots and a second plurality of pivots, each pivot being of the type comprising a base cylindrical member and end cylindrical member means co-axial with said base cylindrical member, tongue means of said end cylindrical member means extending into said base cylindrical member and tongue means of said base cylindrical member extending into said end cylindrical member means, at resilient interconnection interconnecting said end cylindrical member means with said base cylindrical member for permitting flexing of said end cylindrical member means with respect to said base cylindrical member about a flexing axis which is the common axis of said end cylindrical member means and said base cylindrical member, in said first plurality of pivots and in said second plurality of pivots, the base cylindrical member of one pivot, other than a pivot at one end of said first plurality of pivots and at one end of said second plurlaty of pivots, being joined to the end cylindrical member means of a next adjacent pivot such that the flexing axes of said one pivot and said next adjacent pivot are substantially coincident, a first part joining the base cylindrical member of said pivot at said one end of said first plurality of pivots to the base cylindrical member of said pivot at said one end of said second plurality of pivots so that said first and second plurality of pivots have a substantially common axis comprising said flexing axes, a second part joining an end cylindrical member means of a pivot at an opposite end of said first plurality of pivots and an end cylindrical member means of a pivot at an opposite end of said second plulrality of pivots, all remaining base cylindrical members and end cylindrical member means of said first plurality of pivots and said second plurality of pivots being free from interconnections to said first part and said second part.

12. The spring hinge of claim 11 including abutment means extending from said first part for abutting said second part to limit the rotation of said second part with respect to said first part to a position whereat the pivots of said first and second plurality of pivots remain partially stressed.

13. The spring hinge of claim 12 including latch means for latching said first and second parts in a position whereat said second part is not in abutment with said abutment means.

14. The spring hinge of claim 13 wherein the end cylindrical member means of each pivot comprises two cylindrical end members, one spaced from each end of said base cylindrical member and wherein the means to join the base cylindrical member of one pivot to the end cylindrical member means of the adjacent pivot comprises an E-shaped sleeve having three coaxial cylindrical portions joined by a spine, one cylindrical portion of the E-shaped sleeve surrounding said base cylindrical member of one pivot and the remaining cylindrical portions of the E-shaped sleeve surrounding both cylindrical end members of the next pivot.

15. The pivot assembly of claim 14 wherein each pivot further comprises abutment means on said base cylindrical member and said end cylindrical member means for limiting flexing of said pivot in either sense about said flexing axis.

* * * * *

UNITED STATES PATENT AND TRADEMARK OFFICE
CERTIFICATE OF CORRECTION

PATENT NO. : 5,265,853
DATED : November 30, 1993
INVENTOR(S) : Thomas Szirtes

It is certified that error appears in the above-identified patent and that said Letters Patent is hereby corrected as shown below:

column 7, line 13, delete "at" and insert --a--.

column 8, line 24, delete "coaxial" and insert --co-axial--.

Signed and Sealed this

Fourteenth Day of June, 1994

Attest:

BRUCE LEHMAN

Attesting Officer     Commissioner of Patents and Trademarks